Figures 1, 2:
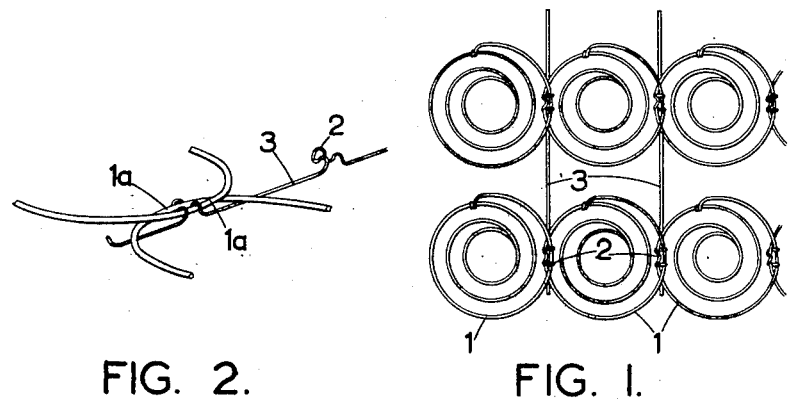

Oct. 2, 1962     R. E. P. MIERS     3,056,434
ASSEMBLING OF FURNITURE SPRING INTERIORS
Filed Aug. 23, 1960     6 Sheets-Sheet 1

RICHARD EUSTACE PROBYN MIERS
INVENTOR.
BY Richardson, David and Nardon
ATTORNEYS.

Oct. 2, 1962    R. E. P. MIERS    3,056,434
ASSEMBLING OF FURNITURE SPRING INTERIORS
Filed Aug. 23, 1960    6 Sheets-Sheet 3
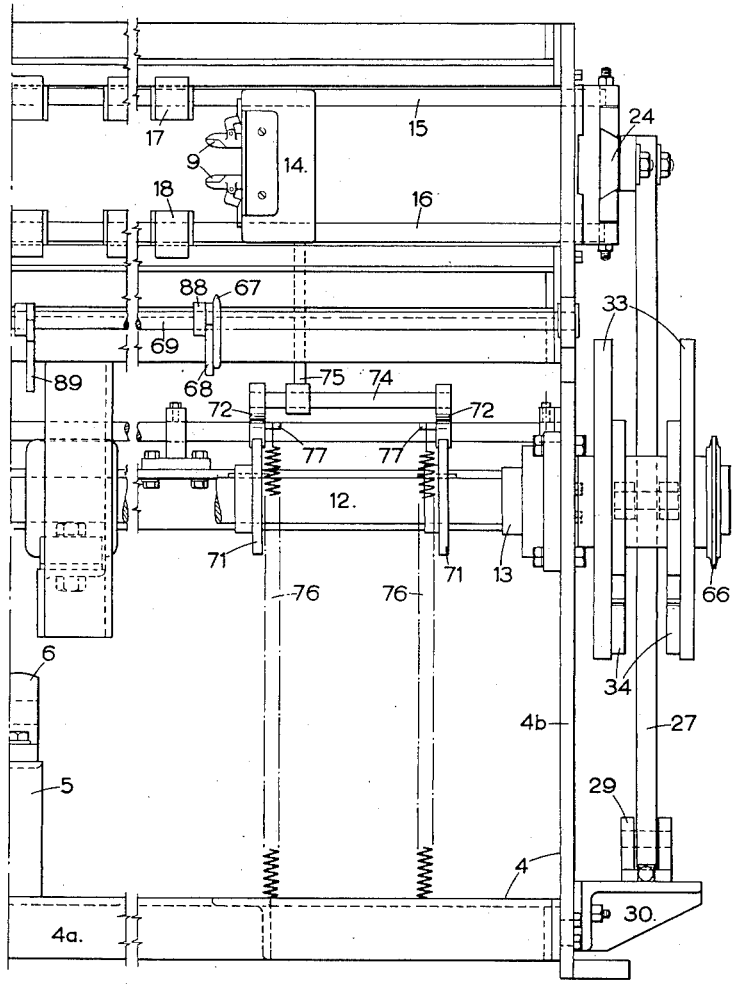
FIG. 3.b.
RICHARD EUSTACE PROBYN MIERS
INVENTOR.
By Richardson, David and Nordon
ATTORNEYS.

Oct. 2, 1962 R. E. P. MIERS 3,056,434
ASSEMBLING OF FURNITURE SPRING INTERIORS
Filed Aug. 23, 1960 6 Sheets-Sheet 5
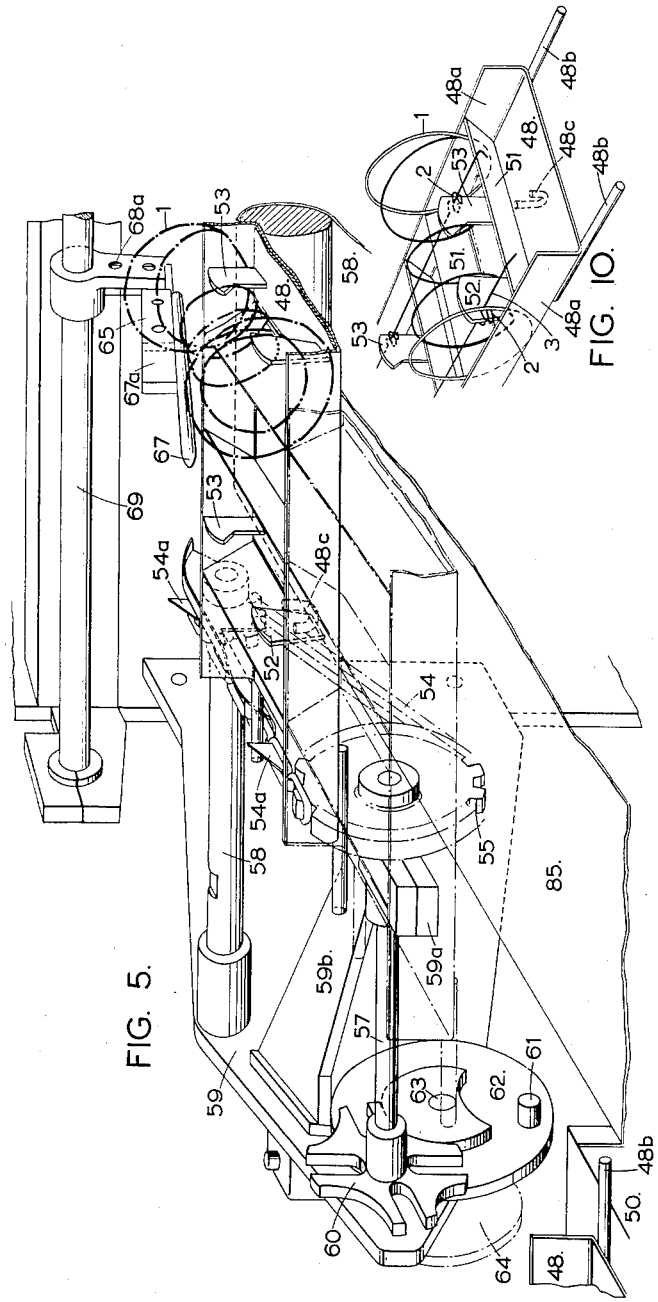
RICHARD EUSTACE PROBYN MIERS
INVENTOR.
By Richardson, Davis and Nardon
ATTORNEYS.

Oct. 2, 1962 R. E. P. MIERS 3,056,434
ASSEMBLING OF FURNITURE SPRING INTERIORS
Filed Aug. 23, 1960 6 Sheets-Sheet 6

RICHARD EUSTACE PROBYN MIERS
INVENTOR.
BY Richardson, David and Nordon
ATTORNEYS.

United States Patent Office 3,056,434
Patented Oct. 2, 1962

3,056,434
ASSEMBLING OF FURNITURE SPRING INTERIORS
Richard Eustace Probyn Miers, London, England, assignor to Pullman (Patent) Products Limited, London, England
Filed Aug. 23, 1960, Ser. No. 51,377
12 Claims. (Cl. 140—2)

This invention relates to improvements in or modification of the invention claimed in Patent No. 2,835,281 in which each assembly to be produced comprises a number of parallel rows of helical or hour-glass type furniture springs coupled together by a plurality of tie wires which are parallel with and which alternate with the rows of springs, each such tie wire having a number of equidistantly spaced hook-like parts which are interlaced with the slightly overlapping end convolutions of the rows of springs.

In Patent No. 2,835,281 hereinafter referred to as the "Parent Patent" there is described a machine which assemblies the tie wires on to the successive rows of springs by gripping such tie wires (already provided with the S-shaped hook-like parts) at their ends, which are cranked for such purpose, and then rotating them in clock-wise and counter-clock-wise directions in order to interlace them with the ends of the springs which have been brought to their required over-lapping configuration, means being provided operating in sequence with each interlacing operation to move the linked-up lines of springs rearwards to enable another line of springs and associated pair of tie wires to be added to the assembly. Once all the tie wires have been assembled on to the springs the whole assembly is sufficiently rigid to maintain itself, pending clinching the S-shaped hooks on to the intersecting parts of the successive rows of furniture springs. However, in Patent No. 2,926,704 there is provided means which during the rearward traction of the springs clinches the S-shaped hooks on to the spring ends.

In the machine described in Patent No. 2,835,281 the frame of the machine is provided with a row of spring holding devices whereby a row of springs is located in the machine under slight compression ready to receive two tie wires which are offered up horizontally to the rows of springs so that one tie wire extends horizontally close above the springs and the other close below the springs at positions forming in plan a chord with the end convolutions of the springs, i.e. between the vertical axes of the springs and their rear parts, the end convolutions then being canted symmetrically by the holders so as to contact them with the tie wires so that each S-shaped hook of the upper tie wire depends from the straight part of the wire through the upper end convolution of the associated spring and each S-shaped hook of the lower tie wire correspondingly projects upwards through the lower end convolution of the associated spring. A second row of furniture springs is next offered up to the aforesaid row of springs and their end convolutions canted by the said holders into planes intersecting the planes of previous line of springs and with the two tie wires resting at the intersection of the end convolutions of the two sets of springs, the tie wires being rotated on their axes so that the two bends of each S-shaped hook become substantially opposed to distinctive spring ends, whereupon the leading line of springs is drawn forwards to mate their end convolutions in the respective bends of the S-shaped hooks, the tie wire holders actuated to free the tie wires, and by continued traction on the springs the S-shaped hooks become closely interlaced with the spring ends and subsequently are clinched on to the springs by clinching mechanisms. This cycle of operations is repeated until the desired number of rows of furniture springs is assembled to form a complete mattress or cushion spring interior.

In the present invention, means is provided to speed up the offering up of the tie wires and rows of springs and, also, accurately locate them in the machine. According to the present invention a machine for assembling furniture springs into mattress spring, and like assemblies by the linking together of the end convolutions of the springs by tie wires alternating with successive rows of springs and each having hook projections shaped to interlace each with a pair of spring end convolutions of two parallel rows of springs, comprises a machine frame with a row of pairs of spring supports, each pair of spring supports comprising upper and lower abutments between which a spring of a row of springs, is gripped, means to support two parallel tie wires and to oscillate them about their axes to interlace their hook projections with the end convolutions of the two rows of springs to be linked together, and loading devices each dimensioned to accommodate at predetermined spacing a line of springs, means to support and convey said loading devices singly in succession to said spring supports to locate successive rows of springs and tie wires in co-operative relationship to interlace the tie wires with the spring end convolutions and means to retract the loading devices from their springs to a position below that at which they are loaded on to said supporting and conveying means and to discharge them for collection for reloading with springs, and means returning immediately following the discharge of a loading device the said supporting and conveying means to the position at which the loaded tray is fed thereon.

Further in accordance with the present invention a machine, for the production of furniture spring assemblies of the type set forth, comprises a row of spring positioning devices functioning to receive a complete row of springs spaced ready for the reception of the S-shaped hooks of two tie wires, means with said devices to impose on the spring end convolutions a substantially symmetrical uniform canting deformation, a loading tray, means to locate and retain in said loading tray a parallel pair of tie wires with their S-shaped projections spaced to correspond with the spacing of the axes of the springs held in said positioning devices, means to locate and retain in said loading tray a further row of correspondingly spaced furniture springs, tie wire grippers adjacent the ends of said positioning devices, means to offer up said loading tray to the line of springs in said positioning devices to engage the ends of the tie wires in said grippers, means actuating said grippers to grip the ends of the tie wires, means with said positioning devices to engage and retain the end convolutions of the springs in said loading tray, means to actuate said offering up means to withdraw the loading tray away from the said latter springs and to discharge the emptied tray away from the machine and then to position the offering up means ready to receive another tray, and means to substitute readily said loading tray with a like tray with a set of furniture springs and two tie wires therein and to locate said further tray on said offering up means ready to repeat the cycle of operations.

Desirably there is provided a conveyor on which loaded trays may be arranged as a train, the conveyor feeding the leading tray on to the said offering up means.

Still further in accordance with the present invention, there is provided a machine frame, a horizontal first shaft on the machine frame, a plurality of spring and tie wire loading trays, arms substantially radiating from said shaft and each provided with an off-set tray receiving part, a second horizontal shaft functioning as a control shaft adapted to be driven uni-directionally, clutch means to connect the control shaft relatively to a prime mover, means under the control of said second shaft to oscillate said first shaft cyclically from a tray receiving position to a spring and tie wire unloading position and then to a position below the tray receiving position to incline the base of the emptied tray and back to the starting or tray receiving position, a chute on to which the inclined emptied trays are delivered for returning them to a collecting point for reloading with springs and tie wires, a row of spring receiving and retaining devices on said machine frame, grippers positioned to receive the ends of the tie wires in position for interlacing the hook-like projections on the tie wires with the springs in said retaining devices and a previously offered up line of springs, means operated from said control shaft to oscillate said grippers to effect said interlacing, said spring receiving and retaining devices comprising for each spring a pair of spaced opposed platforms against which the spring ends are abutted, means operated from said control shaft to cant said platforms to correspondingly deform the springs prior to said interlacing, a spring loading platform for said empty trays, said tray receiving part of said arms being adapted to receive from said loading platform a loaded tray with its base in a substantially horizontal plane whereby, upon initial rotation of the said first shaft the springs in the tray are offered up to said platforms and retained therebetween with the base of the tray in a substantially vertical plane with its springs engaged with the said positioning devices, and conveyor means to guide the loaded trays in succession from said platform on to said tray receiving parts of said arms.

Another feature of the present invention is the construction of the said loading tray, whereby an operator can load therein, under a predetermined compression quickly and accurately spaced a pair of tie wires and a new line of furniture springs to ensure that when the line of springs is offered up to the spring positioning devices all of such springs are under an initial uniform compression to ensure their proper engagement with the said platforms and thereby obviate having to manipulate the springs individually into the positioning devices. The tray in question comprises a shallow rectangular trough having a length sufficient to accommodate at the proper spacing a complete row of furniture springs and a width less than the normal or free unstressed axial dimension of a furniture spring, its depth being substantially less than the end diameter of a spring, the trough being compartmented by transverse partitions to locate the springs in individual parallel compartments, there being provided spacers with the trough to locate a parallel pair of tie wires in position ready for engagement in the aforesaid grippers. Also, to enable each loading tray to be carried into engagement with the said tray receiving parts of said arms, beyond each end of the base of the tray projects two rods which are engaged by pawl-like teeth projecting from two endless conveyor chains fed intermittently in timed sequence with the said arms so that when the arms are in the stationary tray receiving position the two conveyor chains traverse the leading loaded tray on to the said arms, the latter then being raised to offer up the springs and tie wires in the tray to the tie wires interlacing means and the spring and tie wire clinching mechanism at the top of the machine frame.

Figure 6:
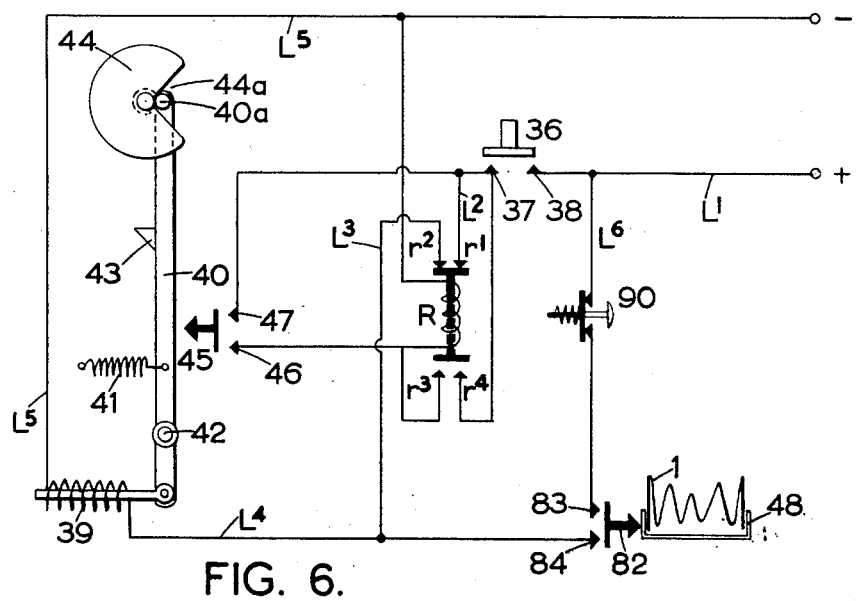
Figure 3A:
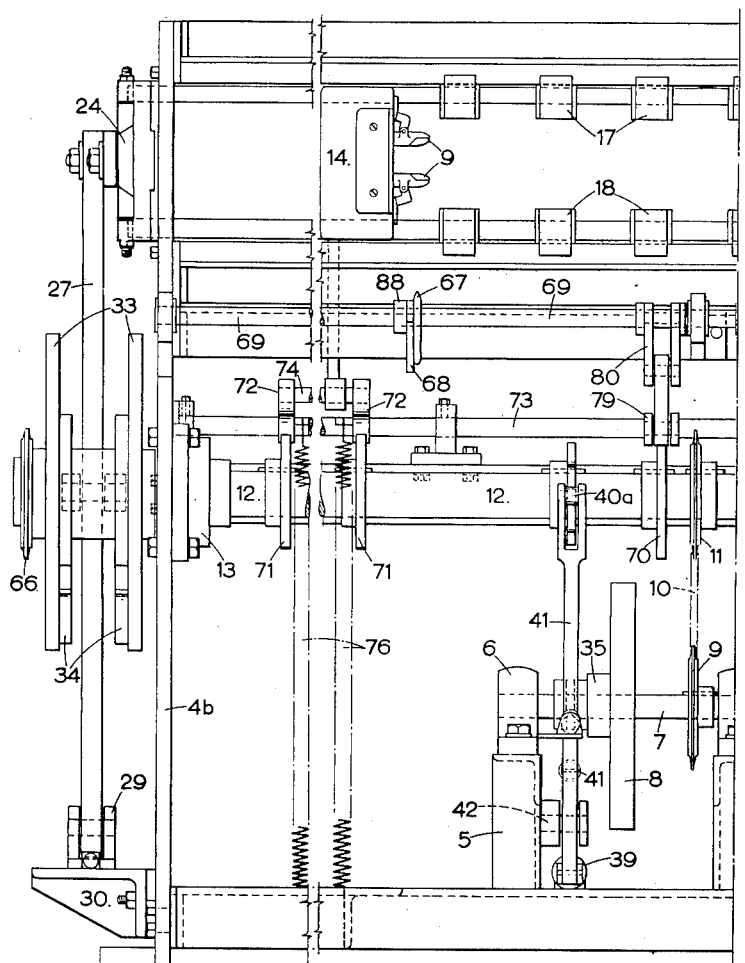
Figure 4:
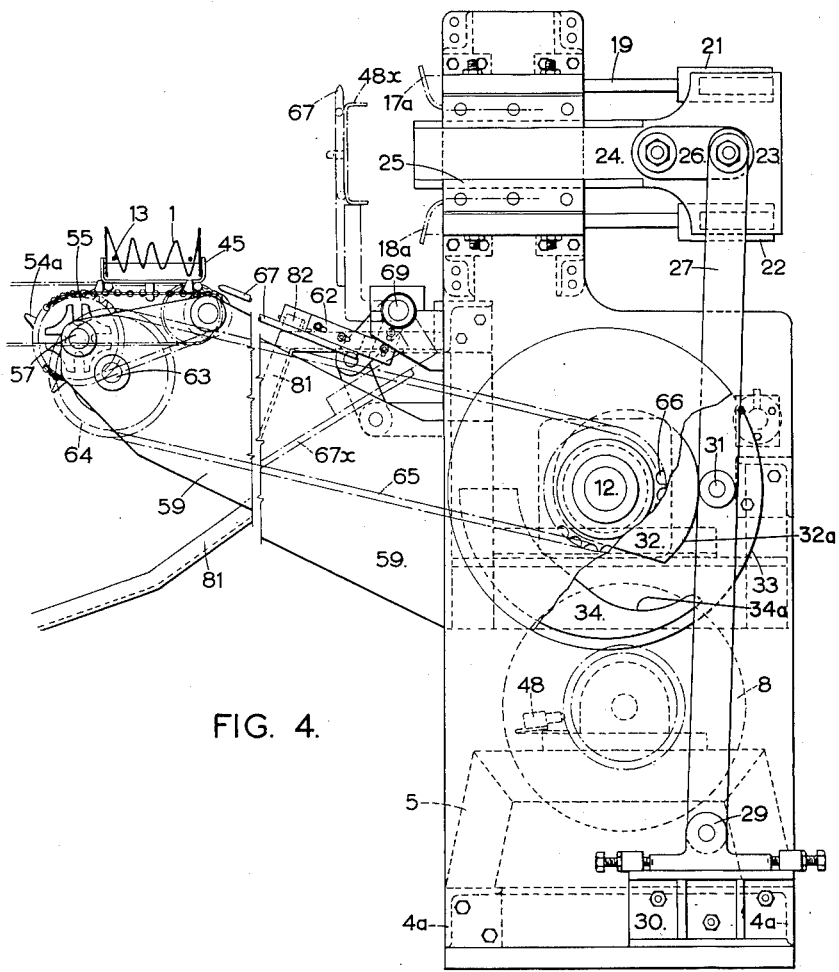
Figure 7:
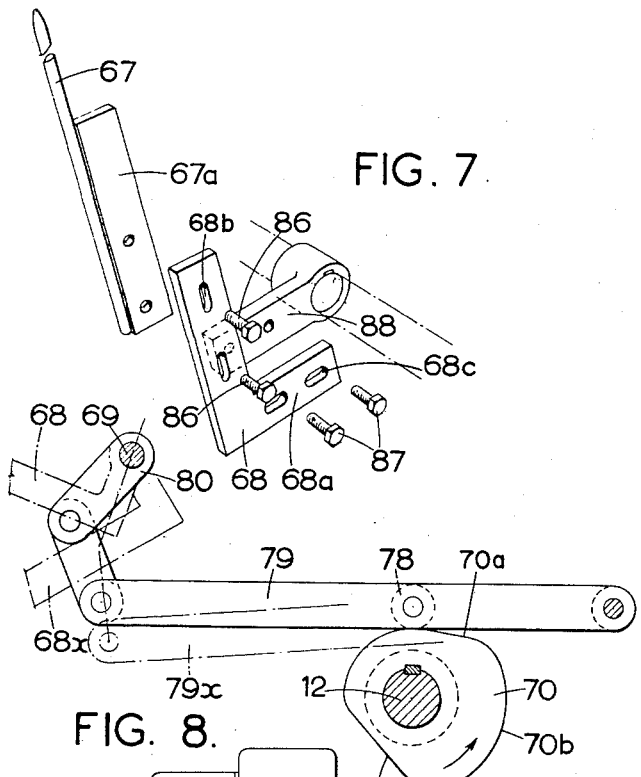
Figure 8:
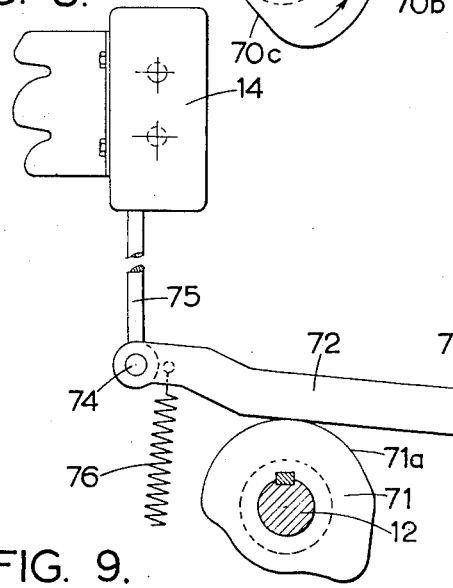
Figure 9:
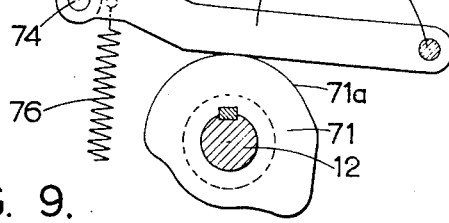

An embodiment of the present invention is illustrated by the accompanying drawings as applied to a machine incorporating some of the features of the machine of Patent No. 2,835,281 and Patent No. 2,926,704 and wherein:

FIGURE 1 is a plan view of a part of a spring assembly produced by the machine of the present invention and similar to that shown in Patent No. 2,835,281, FIGURE 2 is a detail perspective view showing the interlacing of a tie wire with a pair of spring ends, FIGURE 3a and FIGURE 3b, when placed side by side, constitute a broken front elevation of the machine, with the loaded tray conveying means omitted, FIGURE 4 is a broken side elevation view of the machine shown in combined FIGS. 3a and 3b, FIGURE 5 is a perspective view to a larger scale showing in perspective one end part of the means for transferring spring loaded trays on to pick-up arms of the machine adapted to offer up a line of springs to the part of the machine where such line of springs is assembled to preceding lines of springs. This mechanism is omitted from FIGS. 3a and 3b to avoid obscuring the parts of the machine behind it, FIGURE 6 is a diagrammatic view of the electric circuit for bringing in a clutch to start up the machine and at the completion of a first cycle of operations to enable successive cycles to be gone through automatically as successive loaded trays are fed into the machine, FIGURE 7 is a detail exploded perspective view showing one of the devices for picking up spring loaded trays, FIGURE 8 is a detail side elevation view of the cam mechanism for operating the arms shown in FIGURE 7, FIGURE 9 is a detail broken side elevation view of the cam mechanism for operating the grippers, and, FIGURE 10 is a broken perspective view showing details of a loading tray.

Referring to FIGURES 1 and 2 of the drawings, it will be seen that the spring assembly in its finished form has a number of parallel lines of rows of upstanding springs 1 of the "hourglass" or waisted type, i.e. with their end convolutions of greater diameter than the remaining convolutions, the springs being secured together so that for each row each spring 1, with the exception of the two end springs, engages at a relatively short portion 1a of its periphery at both ends against the inner side of the like portion 1x of the adjacent spring, whilst at the diametrically opposed parts of the spring the relationship is reversed. The springs are held in this partially overlapping arrangement of their end convolutions by substantially S-shaped hook-like projections 2 of tie wires 3 which are mated into inter-engagement with the spring end convolutions as shown against one of the hook-like projections 2 in FIGURE 2, whereupon the line of springs with its associated pair of tie wires is fed forwards a distance approximately equal to a spring end diameter and by a succession of these operations the desired length of spring assembly is completed, each displacement of the assembly during its build-up including the clinching of the projections 2 tightly to the overlapping parts of the spring ends to produce the unit shown in FIGURE 1.

Referring to FIGURES 3, 4 and 5 the machine frame generally is indicated by the reference number 4 and secured upon a horizontal pair of angle bars 4a are two bridges 5 supporting journal bearings 6 for an input shaft 7 having a pulley 8 driven by a belt from any suitable prime mover. The shaft 7 carries a sprocket wheel 9 over which is passed a chain 10 driving a similar wheel 11 fixed on the cam shaft 12 journalled in end bearings 13 on vertical end plates 4b. The cam shaft 12 carries cams which produce the required cycle of operations on moving parts of the machine which offer up the springs to clinching mechanism and also controls the actuation of a pair of tie wires so as to oscillate them in a manner which will interlace the S-shaped hooks thereof with the spring ends and the tie wires 3.

The means for imparting oscillation to the horizontal pair of vertically spaced tie wires to interlace them with the springs may be substantially the same as that described in Patent No. 2,835,281 in which there are provided two pairs of rotary grippers indicated generally at G and supported for rotation in a pair of housings 14 secured between horizontal frame members 15 and 16 disposed at the upper end of the machine.

Supported by the members 15 and 16 are upper and lower sets of spring locators 17 and 18 respectively having inclined platforms 17a and 18a (see FIGURE 4) which are shaped to receive the end convolutions of the line of springs, each spring being held under compression between the platforms 17a and 18a so as to cant the upper and lower ends of the springs to bring the foremost parts of the end convolutions into engagement with the two tie wires held across the two pairs of grippers G. In Patent No. 2,926,704 is described the mechanism for imparting a tilting operation to the platforms and in association therewith is provided means to clinch the S-shaped projections of the tie wires upon the springs so as to link successive rows of springs together and also to draw the assembled lines of springs rearwardly until the desired number of rows of springs are built up to form a complete mattress spring assembly.

The invention of the present application is not concerned with the mechanism for interlacing the tie wires with the springs or with the mechanism for feeding the assembled springs rearwardly in clinching the tie wires, and in common with the mechanism shown in Patent No. 2,835,281 or Patent No. 2,926,704 the two lines of feeding and clinching mechanisms are operated by a fore and aft reciprocating mechanism including upper and lower push and pull rods 19 and 20 respectively fixed at their rear ends to transverse beams 21 and 22 which at their ends are fixed in a pair of head plates 23 having forwardly extending dove-tail section bars 24 reciprocating in slides 25 fixed to the side members 4a of the main frame. The heads 23 are connected by links 26 to the upper ends of two beams 27 pivoted at their lower ends by pivot pins 28 to a pair of brackets 29 secured on footsteps 30 secured to the base of the machine. Between their ends each beam 27 carries a pair of rollers 31 which are tracked by a pair of cams 32 on opposed discs 33, the two pairs of discs being carried by the ends of the cam shaft 12. Co-operating with the cams 32 are additional cams 34 on the discs 33 which are also tracked by the rollers 31. The arrangement is such that the two lines of clinching mechanisms are reciprocated and held in idle positions in timed relationship with the offering up of the tie wires and springs, the interlacing of the tie wires with the springs and the retraction of the interlaced tie wires and springs away from the grippers G so that following the interlacing operation the clinching and feeding devices which carry the platforms 17a and 18a are drawn rearwardly an amount approximately equal to the diameter of the spring ends, these clinching mechanisms then being moved forwardly to position platforms 17a and 18a ready to receive the next row of springs with the associated pair of tie wires.

When the machine is stationary a clutch indicated diagrammatically by the reference numeral 35 is in the open position so that the pulley 8 is idle with respect to the shaft 7. To start the machine a switch indicated diagrammatically by the reference numeral 36 in FIGURE 6 is operated to close the contacts 37 and 38 and, as hereafter explained, this results in the energising of a solenoid 39 to rock a lever 40 against the influence of a spring 41 about a fulcrum 42 so as to bring a striker projection 43 on the lever into engagement with the appropriate part of the clutch mechanism to connect the pulley 8 positively to the shaft 7 so that the cam shaft 12 is now rotated via the two sprocket wheels 9 and 11 and the chain 10. The clutch is held in the "in" position for about 270° of rotation of a cam 44 provided with a recess 44a in which, when the machine is stationary, a roller 40a on a pin on the lever 40 engages. Once the cam 44 tracks the roller 40a so as to hold the lever 40 in the clutch "in" position, the solenoid 39 is de-energised by reason of the lever 40 engaging a micro-switch 45 so as to make a pair of contacts 46 and 47. Consequently, during the aforesaid 270° rotation of the cam 44 there is no need for the switch 36 to be operated, it only requiring a momentary depression of the switch button to start up the machine, any operation of the switch button during movement of the machine not having any effect upon the working stages of the machine.

Referring again to FIGURE 6, the circuit shown therein can be regarded as incorporating the switch 36, the button of which is depressed to make the contacts 37 and 38. When the machine is idle a relay R at its upper end in FIGURE 6 bridges a pair of contacts $r1$, $r2$ whereby the current flow is via lead L1, switch 36, lead L12, contacts $r1$, $r2$, lead L3, lead L4, solenoid 39 back to negative via lead L5, the energising of the solenoid 39 pulling inwards the lower end of the lever 40 about the fulcrum 42 and withdrawing the striker 43 on the lever to free the clutch under the influence of a spring therein to the "in" position whereupon the lever engages the microswitch 45 which energises the coil of the relay R to close the contacts $r3$, $r4$. The shaft 7 is now positively connected to the cam shaft 12, the cam 44 taking over to maintain the clutch in the "in" position.

An important feature of the present invention is the loading of spring holding trays 48 into a position where they are picked up during the rotation of the cam shaft and offered up successively to the platforms 17a, 18a, the tie wires then being interlaced with the preceding springs and the springs in the trays. One of the loaded trays is shown in FIGURE 4 in a position where it is about to be picked up by the means, hereinafter described, which transfers the loaded tray to the position shown in broken lines 48x. This tray is loaded with a complete line of springs and as shown in FIGURES 5 and 10 the tray 48 has each spring compressed between its side flanges 48a so that for a predominant portion of the diameter of the spring ends all of the springs project upwardly of the tray so that they can be located to bring their end convolutions into slight overlapping relationship with the end convolutions of the preceding line of springs already between the platforms 17a, 18a which, as aforesaid, enables the two tie wires also in the grippers G to be interlaced with the overlapping spring ends, e.g. as in Patent No. 2,835,281 in which the platforms 17a, 18a cant the springs received between them so that their ends are in converging planes and where they overlap they are suitably aligned with the two tie wires held in the grippers G.

Another feature of the present invention is the provision alongside the machine of a loading platform, only a small part of which is shown by the reference number 50 in FIGURE 5, part of the loading tray 48 being shown thereon. Each loading tray is dimensioned to accommodate, at the required regular spacing, the desired number in line of furniture springs under compression as aforesaid, each spring being held between an appropriate pair of a number of downwardly converging partitions 51 extending in pairs transversely across the tray. The tray carries a number of upstanding lugs 52 and 53 against the outer edges of which are located the tie wires which rest upon the upper edges of the partitions 51, the ends of the tie wires projecting beyond the end springs so that when the tray is offered up to the platforms 17a, 18a the cranked ends of the tie wires will be engaged in the grippers G which will open to receive and grip the ends of the tie wires and will be oscillated in the manner described in Patent No. 2,835,281 to interlace the S-shaped hooks thereof of the spring ends. The two tie wires are maintained properly spaced by the lugs 52 and 53 and are retained in position by engaging over the outer edges of the end pair of lugs the adjacent pair of S-shaped hooks, as shown in FIGURE 10, e.g. by pressing each hook over the associated lug so that the lug engages firmly in the side limbs of the S-shaped hook.

Although only a part of a platform or bench 50 is shown in practice this structure is big enough to support a number of trays 48 so that one operator can preload the trays ready for successive feeding into the tray. The base of each tray carries a parallel pair of rods 48b projecting beyond the ends of the tray and adapted to be fed upon a pair of endless chins 54 (see FIGURE 5) carried over a pair of sprocket wheels 55 and 56 carried respectively by a pair of shafts 57 and 58 projecting inwardly from a pair of side brackets 59 secured to the side members 4b of the machine frame. The other ends of the shafts 57, 58 are supported in bearings on a beam 59a carried by a bracket 59b rigid with 59. The chains 54 are driven intermittently under the control of two Geneva gear members 60 provided one with each shaft 57, and the members 60 are driven each by a lateral pin 61 carried by an imput disc 62 fixed to a shaft 63 carrying a sprocket wheel 64 driven by an endless chain 65 from the cam shaft 12 which carries a sprocket wheel 66 over which the chain 65 also passes. The Geneva mechanism produces rotation to the sprocket wheels 55 during the last 90° rotation of the main cam shaft. The chains 54 are provided at regular intervals with lugs 54a which are inclined to enable the tray rods 48 to be passed forwardly thereover to abut against the leading edges of the lugs 54a. A pair of hooks 48c depend from the base of each tray, and at the completion of each movement of the chains 54 the leading tray 48 is so positioned that its pair of hooks 48c become aligned with a pair of prongs 67 projecting upwardly and forwardly at an inclination from the machine and carried by a pair of L-shaped arms 68 fixed to a horizontal shaft 69 so that the leading tray slides downwards with its hooks 48c engaged over the prongs 67 with the loading wall 48a of the tray abutting against the limbs 68a of the arms 68, whereupon the shaft 69 under the control of a cam 70 (see FIGURES 3 and 8), is rotated through about 80° to the position shown in broken lines in FIGURE 4 to oppose the line of springs in the tray 48 to the platforms 17a, 18a whereupon the grippers G are oscillated under the control of two pairs of cams 71 (see FIGURES 3 and 9) on the cam shaft 12. For the latter purpose the cams 71 track two pairs of arms 72 radiating from a horizontal rod 73, each pair being bridged by a rod 74 on which is journalled the lower end of a link 75 operating the mechanisms inside the two housings 14 for oscillating the grippers G. The arms 72 are held in close contact with the cam 71 by coiled compression springs 76 at their outer ends looped over pins 77 projecting from the arms 72 and at their lower ends anchored to the base of the machine frame. The oscillating movement applied to the grippers is so controlled by the cam shaft 71 that for each portion 71a (see FIGURE 9) no movement is imparted to the arms 72, the parts 71a occupying about 180° of the cam 71 to produce the idle stage of the grippers when the trays are offered up to the grippers and during this stage the cams 32 on the disc 33 operate the pivoted side arms 27 to bring the platforms 17a, 18a into the spring receiving position after having effected the rearward displacement of the previously assembled springs and tie wires with the clinching of the tie wires on to the springs.

The timed operation of the L-shaped arm 68 carrying the prongs 67 under the control of the cam 70 is obtained by engaging with the cam 70 a roller 78 on a pair of rocking arms 79 pivoted at one end to the rod 73 and at its front end connected by links 80 to the shaft 69.

In FIGURES 4 and 8 the cams 70 and 71 are shown in the position when the L-brackets 68 have just received the loaded tray 48 and are about to be swung upwards by the profile part 70a of cam 70 to the position shown in broken lines in FIGURE 4 so that there is still an idling period governed by profile part 71a of cam 71 for the mechanism which oscillates the grippers G which at this idle stage have their jaws open to receive the cranked ends of the two tie wires whereupon by the influence of an idle profile part 70b of cam 70 the trays 48 and shaft 69 are held stationary whilst the grippers interlace the tie wire L-shaped hooks with the previously assembled line of furniture springs between jaws 17 and 18 and the rollers 31 (see FIGURE 4) on swinging arms 27 leave the profile part 32a of each cam 32 and are tracked by the parts 34a of cams 34 to actuate the spring receiving jaws 17 and 18 and when the grippers G have completed the interlacing of the S-shaped hooks of the two tie wires the clinching mechanisms associated with the jaws 17 and 18 will draw the interlaced lines of springs and tie wires rearwards as described in Patent No. 2,926,704 at which stage the flat profile part 70c of cam 70 will cause the arms 79 to move to the position 79x (see FIGURE 8) and the rods 67 on arms 68 to occupy a downwardly inclined position 67x, 68x to cause the empty tray to slide therefrom on to chute rails 81 for returning them for reloading. Following this stage, the arms 68 are returned to the tray receiving position and the roller 40a on the rocking beam 27 moves into the recess 44a of cam 44 to de-clutch the clutch 35 and restore the machine to the condition ready to repeat the cycle of operations which may be effected automatically by the next loaded tray 48 as it slides along the prongs 67 engaging a micro-switch 82 (see FIGURES 4 and 6) to connect the solenoid 39 in circuit via leads L1, L5, micro-switch contacts 83, 84, lead L4, solenoid 39 and lead L5. From this it will be seen that so long as an operator can maintain a constant supply of loaded trays to the feed chains 54 a succession of complete cycles of operations will be carried out without the necessity of any other manual operation until the desired number of lines of springs have been assembled. The machine may be stopped at any time by actuation of a switch 90. To enable a train of loaded trays to be arranged for transfer in succession on to the chains 54 an endless conveyor belt or a platform may be disposed in the space between the upper tracks of the chains 54 to receive a train of loaded trays, and in FIGURE 5 is shown the upper track of a conveyor belt 85 passing alongside the bench 50, the conveyor belt having a width nearly equal to the width between the depending hooks 48c of the trays thus enabling the trays to be aligned in a tidy train. The conveyor belt may be timed to travel with the chains 54 or may have a continuous relatively slower rate of travel in which event one of the swinging L-shaped arms 68 may actuate a trip mechanism which upon the return of the arms 68 to their starting position will displace from the path of the leading loaded tray on the conveyor a stop which before its displacement acts to prevent the leading tray from passing on to the prongs 67 and arms 68, the conveyor sliding idly under the train of loaded trays when the stop is positioned in the path of the leading tray.

To enable the positions of the prongs 67 to be located accurately each prong 67 is formed with a web plate 67a (see FIGURE 7) adjustable endwise in its connection by studs 86 and slots 68b in the lower limb of the L-shaped bar 68, the limb 68a of said bar having slots 68c receiving studs 87 for securing it adjustably to a bracket 88 radiating from the shaft 69.

The brackets 88 carrying the prong fitted arms 68 are splined for adjustment along the shaft 69 and the gripper housings 14 are adjustable to vary the space between the two pairs of grippers to enable the machine to be adjusted for different widths of spring assemblies, the number of clinching mechanisms with platforms 17 and 18 being selected for a given width of spring assembly.

To relieve the prongs 67 of the weight of the loaded trays an L-shaped arm 89 (see FIGURE 3) somewhat similar to the arms 68 but with a lower limb long enough to engage under the ful width of the tray is secured to the shaft 69 about midway between the arms 68.

I claim:

1. Apparatus for assembling mattress spring and like assemblies consisting of a plurality of parallel rows of helical type furniture springs with tie wires alternating and parallel with such rows of springs and interlaced with the end convolutions of the springs, comprising a machine frame, means on said frame to interlace the tie wires with a successive row of springs, loading trays each adapted to receive a single row of the springs and an associated pair of tie wires, plurality of devices to receive in succession the rows of springs with their tie wires and to feed the rows interlaced with their tie wires by successive stages until the desired length of spring assembly is built up, means in association with said devices adapted to receive and grip the tie wires and thereupon to interlace the tie wires with the end convolutions of the springs, cyclically operative conveyor means adapted to receive loaded trays in succession, tray support means on to which the loaded trays are delivered in succession at intervals by said conveying means and adapted to transfer the loaded trays singly from said conveyor means upwards into juxtaposition to said devices with the springs and tie wires in the tray positioned ready for the interlacing of the tie wires with said springs, means operating in synchronism with said conveyor means during said intervals to move said support means to said position where the springs and tie wires are positioned for interlacing the springs with the tie wires and to withdraw the empty tray from the springs and to carry the tray to a position spaced from said conveyor means, means to receive from said support means the empty tray and to discharge it from the machine, and a platform for the trays located in juxtaposition to said conveyor means.

2. Apparatus according to claim 1 further comprising intermittently operative means operated by the displacement of each loaded tray on to said support means to stop the drive of the machine by a prime mover when said support means returns to its loaded tray receiving position following the discharge of an empty tray therefrom, and means operated by the location of a loaded tray on to said support means to restore the driven connection of the machine to the prime mover for carrying out a complete cycle of operations.

3. Apparatus according to claim 1 wherein said support means comprises a pair of arms supported by shafting to which partial rotation is imparted in one direction to raise them from the loaded tray receiving position to the position for connecting the springs and tie wires in such tray to a preceding rows of springs of a partially completed spring assembly, and held stationary during such connection, partially rotated through a greater angle to an empty tray discharging position and counter-rotated back to the loaded tray receiving position, a cam shaft driven through a complete rotation during the foregoing cycle of operations and having a cam controlling the said movements of the said shafting, a clutch to connect and disconnect the drive of the prime mover to said cam shaft, and electrically energized means actuated by the loaded tray when received by said arms actuating the clutch to effect said connection of the cam shaft to the prime mover, and a further cam on said cam shaft maintaining the clutch in following the actuation of the clutch by said electrically energized means.

4. Apparatus according to claim 3 wherein said arms carry prongs and the said tray is provided with parts adapted to mate over said prongs in order to relate the tray to the arms in the correct position for bringing the springs and tie wires in the tray into alignment with the springs to which they are to be connected.

5. Apparatus according to claim 3 including means to impart intermittent movement to said conveyor means each movement being timed to deliver a loaded tray on to said arms.

6. Apparatus according to claim 3 wherein said arms are adjustable for effective length and spacing apart.

7. Apparatus according to claim 3 wherein in association with one of said arms there is provided an electrical switch normally open but closed by the engagement therewith of a loaded tray to close a circuit for said electrically energized means.

8. Apparatus according to claim 4 including a further switch manually controlled to bring into circuit said electrically energized means, and a still further switch actuated from the clutch cam when the clutch is brought in to cut out the manually controlled switch from the circuit.

9. A machine of the class described comprising a machine frame with a row of pairs of spring supports, each pair of spring supports comprising upper and lower abutments between which a single spring of a row of helical coil springs is adapted to be gripped, means adapted to support two parallel tie wires having a series of laterally projecting hook portions and to oscillate them about their axes to interlace their hook projections with the end convolutions of the two adjacent rows of springs to be linked together, and loading devices each dimensioned to accommodate at predetermined spacing a line of springs together with a parallel spaced pair of tie wires subsequently to be interlaced with said line of springs, intermittently operative means to support and convey said loading devices singly in succession to said spring supports to locate successive rows of springs and tie wires in cooperative relationship with the said spring supports and said means adapted to oscillate the tie wires to interlace the tie wires with the spring end convolutions and means operative in synchronism with said intermittently operative means to retract the loading devices from their springs tie wires to a position below that at which they are loaded on to said supporting and conveying means and to discharge them for collection for reloading with springs, and means returning immediately following the discharge of a loading device the said supporting and conveying means to the position at which the loaded tray is fed thereon.

10. A machine for assembling furniture springs into mattress spring, and like assemblies by the linking together of the end convolutions of the springs by tie wires alternating with successive rows of springs and each having hook projections shaped to interlace each with a pair of spring end convolutions of two parallel rows of springs, said hook projections each being S-shaped, comprising a row of spring positioning devices functioning to receive a complete row of springs spaced ready for the reception of the S-shaped hooks of two tie wires, means with said devices to impose on the spring end convolutions a substantially symmetrical uniform canting deformation, a loading tray, means to locate and retain in said loading tray a parallel pair of tie wires with their S-shaped projections spaced to correspond with the spacing of the axes of the springs held in said positioning devices, means to locate and retain in said loading tray a further row of correspondingly spaced furniture springs, tie wire grippers adjacent the ends of said positioning devices, means to offer up said loading tray to the line of springs in said positioning devices to engage the ends of the tie wires in said grippers, means actuating said grippers to grip the ends of the tie wires, means with said positioning devices to engage and retain the end convolutions of the springs in said loading tray, means to actuate said offering up means to withdraw the loading tray away from the said latter springs and to discharge the emptied tray away from the machine and then to position the offering up means ready to receive another tray, and means to substitute readily said loading tray with a like tray with a set of furniture springs and two tie wires therein and to locate said further tray on said offering up means ready to repeat the cycle of operations.

11. A machine for assembling furniture springs into mattress spring, and like assemblies by the linking together of the end convolutions of the springs by tie wires alternating with successive rows of springs and each having hook projections shaped to interlace each with a pair of spring end convolutions of two parallel rows of springs, comprising a machine frame, a horizontal first shaft on the machine frame, a plurality of spring and tie wire loading trays, arms substantially radiating from said shaft and each provided with an off-set tray receiving part, a second horizontal shaft functioning as a control shaft adapted to be driven uni-directionally, clutch means to connect the control shaft relatively to a prime mover, means under the control of said second shaft to oscillate said first shaft cyclically from a tray receiving position of said arms to a spring and tie wire interlacing position of the tray on said arms and above the tray receiving position and then withdraw the tray from the springs and tie wires to a position below the tray receiving position to incline the base of the emptied tray and back to the starting or tray receiving position, a chute on to which the inclined emptied trays are delivered for returning them to a collecting point for reloading with springs and tie wires, a row of spring receiving and retaining devices on said machine frame, grippers positioned to receive the ends of the tie wires in position for interlacing the hook-like projections on the tie wires with the springs in said retaining devices and a previously offered up line of springs, means operated from said control shaft to oscillate said grippers to effect said interlacing, said spring receiving and retaining devices comprising for each spring a pair of spaced opposed platforms against which the spring ends are abutted, means operated from said control shaft to cant said platforms to correspondingly deform the springs prior to said interlacing, a spring loading platform for said empty trays, said tray receiving part of said arms being adapted to receive from said loading platform a loaded tray with its base in a substantially horizontal plane whereby, upon initial rotation of the said first shaft the springs and tie wires in the tray are offered up to said pairs of platforms and grippers respectively and retained therebetween with the base of the tray in a substantially vertical plane with its springs engaged with the said positioning devices, and conveyor means to guide the loaded trays in succession from said platform on to said tray receiving parts of said arms.

12. A machine according to claim 11 wherein each loading tray comprises a rectangular trough having a length sufficient to accommodate at the proper spacing a complete row of furniture springs and a width less than the normal or free unstressed axial dimension of a furniture spring, its depth being substantially less than the end diameter of a spring, the trough being compartmented by transverse partitions to locate the springs in individual parallel compartments, there being provided spacers with the trough to locate a parallel pair of tie wires in position ready for engagement in the aforesaid grippers, two rods projecting beyond each end of the tray base for engagement with abutments on the means conveying the loaded tray on to the tray receiving part or arms of the machine.

References Cited in the file of this patent

UNITED STATES PATENTS

| | | |
|---|---|---|
| 2,296,878 | Saval | Sept. 29, 1942 |
| 2,715,973 | Winfree et al. | Aug. 23, 1955 |
| 2,835,281 | Miers | May 20, 1958 |